(12) United States Patent
Sun et al.

(10) Patent No.: US 10,708,925 B2
(45) Date of Patent: Jul. 7, 2020

(54) RESOURCE ALLOCATION METHOD AND DEVICE

(71) Applicant: HUAWEI TECHNOLOGIES CO., LTD., Shenzhen, Guangdong (CN)

(72) Inventors: Jizhong Sun, Xi'an (CN); Liang Chen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/252,003

(22) Filed: Jan. 18, 2019

(65) Prior Publication Data

US 2019/0159216 A1    May 23, 2019

Related U.S. Application Data

(63) Continuation of application No. PCT/CN2016/090869, filed on Jul. 21, 2016.

(51) Int. Cl.
*H04W 72/04* (2009.01)
*H04W 72/08* (2009.01)
(Continued)

(52) U.S. Cl.
CPC ......... *H04W 72/082* (2013.01); *H04L 1/1614* (2013.01); *H04L 5/0073* (2013.01);
(Continued)

(58) Field of Classification Search
CPC ............... H04W 72/082; H04W 72/04; H04W 72/0453; H04W 72/0446; H04W 4/40; H04L 5/0073; H04L 1/1614; H04L 5/0005
See application file for complete search history.

(56) References Cited

U.S. PATENT DOCUMENTS

| 2016/0073298 | A1* | 3/2016 | Brahmi | H04W 36/0011 |
| | | | | 455/436 |
| 2016/0302223 | A1* | 10/2016 | Song | H04W 72/1263 |
| 2018/0132086 | A1* | 5/2018 | Zhang | H04W 4/70 |

FOREIGN PATENT DOCUMENTS

| CN | 104869527 A | 8/2015 |
| CN | 105165058 A | 12/2015 |

(Continued)

OTHER PUBLICATIONS

XP051080220 R1-162483 LG Electronics,"Discussion on resource pool design for PC5 based V2V",3GPP TSG RAN WG1 Meeting #84bis,Busan, Korea Apr. 11-15, 2016,total 6 pages.
(Continued)

*Primary Examiner* — Lakeram Jangbahadur
(74) *Attorney, Agent, or Firm* — Kilpatrick Townsend & Stockton LLP

(57) ABSTRACT

A resource allocation method includes: determining, by a network-side device based on a maximum quantity of transmissions of a terminal device in a scheduling period, a set including at least two groups of patterns, where any group of patterns and any other group of patterns in the set are corresponding to a maximum of K same first subframes, and the first subframe is a subframe to which a frequency domain resource is allocated; receiving, by the network-side device, resource scheduling request messages sent by at least two terminal devices; determining, by the network-side device, a target group of patterns from the set based on the resource scheduling request messages, where the target group of patterns are in a one-to-one correspondence with the at least two terminal devices; and separately sending, by the network-side device, information about the target group of patterns to the at least two terminal devices.

20 Claims, 4 Drawing Sheets

(51) Int. Cl.
H04W 4/40 (2018.01)
H04L 1/16 (2006.01)
H04L 5/00 (2006.01)

(52) U.S. Cl.
CPC ............ *H04W 4/40* (2018.02); *H04W 72/04* (2013.01); *H04W 72/0446* (2013.01); *H04W 72/0453* (2013.01); *H04L 5/0005* (2013.01)

(56) References Cited

FOREIGN PATENT DOCUMENTS

WO     2014173429 A1    10/2014
WO     2016045564 A1    3/2016

OTHER PUBLICATIONS

International Search Report, dated Apr. 27, 2017, in International Application No. PCT/CN2016/090869 (4 pp.).
International Search Report dated Apr. 27, 2017 in corresponding International Patent Application No. PCT/CN2016/090869 (7 pages).
Written Opinion of the International Searching Authority dated Apr. 27, 2017 in corresponding International Patent Application No. PCT/CN2016/090869 (4 pages).

* cited by examiner

RESOURCE ALLOCATION METHOD AND DEVICE

CROSS-REFERENCE TO RELATED APPLICATIONS

This application is a continuation of International Patent Application No. PCT/CN2016/090869, filed on Jul. 21, 2016, the disclosure of which is hereby incorporated by reference in its entirety.

TECHNICAL FIELD

The present invention relates to the communications field, and in particular, to a resource allocation method and device.

BACKGROUND

Vehicle direct communication (VDC) means that vehicles directly communicate with each other by using a mobile communications device, for example, transfer information about a vehicle speed, location, driving direction, brake, and the like to each other.

In a motion process of vehicle user equipment (VUE), a size of a data packet for transferring a security assistance message between vehicles dynamically changes based on information such as a driving speed, an acceleration, and a direction, and a period also dynamically changes. Therefore, to reduce a transmission delay of the data packet and ensure packet delivery ratio (PDR) performance of the data packet, a base station needs to dynamically and flexibly schedule a time-frequency resource based on the size of the data packet.

Currently, device-to-device (D2D) communication of a Long Term Evolution (LTE) system supports a relatively small quantity of users, and when there are a relatively large quantity of VUEs, if D2D communication is used, a severe half-duplex collision in time domain and co-channel interference in frequency domain occur between different intra-cell VUEs and between different inter-cell VUEs, and an interference problem caused by severe in-band emission (IBE) occurs.

SUMMARY

In view of this, embodiments of the present invention provide a resource allocation method and device. A set of patterns corresponding to a time-frequency resource are determined based on a sidelink control (SC) period, and in different cells or in a same cell, a suitable pattern may be selected from the set of patterns based on a to-be-scheduled queue, for dynamic resource allocation, so as to ensure that half-duplex collisions between VUEs are minimized, and impact of in-band emission is reduced, and in addition, a different interference coordination policy is implemented for a different cell, to ensure that frequency bands are staggered, and co-channel interference is reduced to improve PDR performance of the VUEs.

According to a first aspect, a resource allocation method is provided, where the method includes:

determining, by a network-side device based on a maximum quantity of transmissions of a terminal device in a scheduling period, a set including at least two groups of patterns, where the set is corresponding to a time-frequency resource pool, the time-frequency resource pool includes N subframes, each group of patterns are in a one-to-one correspondence with the N subframes, a quantity of first subframes corresponding to each group of patterns is the same as the maximum quantity of transmissions, the first subframe is a subframe to which a frequency domain resource is allocated, and any group of patterns and any other group of patterns in the set are corresponding to a maximum of K same first subframes, where N and K are integers, N>2, and K is greater than or equal to 0 and is less than the maximum quantity of transmissions;

receiving, by the network-side device, resource scheduling request messages sent by at least two terminal devices, where the resource scheduling request message is used to request the network-side device to allocate a time-frequency resource to a terminal device corresponding to the resource scheduling request message, and the time-frequency resource is used by the at least two terminal devices to perform broadcast communication;

determining, by the network-side device, a target group of patterns from the set based on the resource scheduling request messages, where the target group of patterns are in a one-to-one correspondence with the at least two terminal devices, and a quantity of the first subframes corresponding to the target group of patterns is equal to a maximum quantity of transmissions of the at least two terminal devices; and separately sending, by the network-side device, information about the target group of patterns to the at least two terminal devices.

According to the resource allocation method in this embodiment of the present invention, the network-side device determines in advance the set including the at least two groups of patterns, where the any group of patterns and the any other group of patterns in the set are corresponding to a maximum of K same transmission subframes; and the target group of patterns are selected from the set based on the scheduling request information sent by the terminal device, to be allocated to the terminal device, so that the terminal device performs broadcast communication by using a time-frequency resource corresponding to the target group of patterns. This avoids a communication failure caused when a quantity of half-duplex collisions is greater than or equal to the maximum quantity of transmissions of the terminal device.

Optionally, the determining, by the network-side device, the target group of patterns from the set includes: determining, by the network-side device, the target group of patterns from the set in ascending order of values of K. In this way, a quantity of half-duplex collisions can be minimized, and a communication success rate is improved.

Optionally, the determining, by the network-side device, the target group of patterns from the set includes:

determining, by the network-side device based on that a quantity of the terminal devices is less than or equal to a preset value, the target group of patterns from the set in ascending order of values of K; or determining, by the network-side device based on that a quantity of the terminal devices is greater than the preset value, the target group of patterns from the set in descending order of values of K; or determining, by the network-side device based on that a quantity of the terminal devices is greater than the preset value, the target group of patterns from the set in ascending order of values of K and according to a rule of allocating a same subframe to terminal devices relatively close to each other in the terminal devices.

According to the resource allocation method in this embodiment of the present invention, a requirement of reducing a quantity of half-duplex collisions can be preferentially met when there are a relatively small quantity of terminal devices, and a requirement of scheduling as many users as possible can be preferentially met when there are a relatively large quantity of terminal devices. In addition, when there are relatively many terminal devices, a same subframe may be allocated to terminal devices relatively close to each other, reducing interference caused by in-band emission.

Optionally, before the receiving, by the network-side device, the scheduling request messages, the method further includes:

determining, by the network-side device, a resource bitmap based on the time-frequency resource pool corresponding to the set, where the resource bitmap is corresponding to the N subframes, the resource bitmap includes a pattern corresponding to the first subframe in the set, the pattern corresponding to the first subframe is first sorted and indexed according to a time domain, and then sorted and indexed according to a frequency domain, and any group of patterns corresponding to the first subframe and any other group of patterns corresponding to the first subframe in the resource bitmap are corresponding to a maximum of K same subframes, where the maximum quantity of transmissions of the terminal device is greater than or equal to 2; and the determining, by the network-side device, a target group of patterns from the set based on the resource scheduling request messages includes:

determining, by the network-side device, the target group of patterns from the resource bitmap based on the resource scheduling request messages.

In this embodiment of the present invention, a base station maximizes groups of patterns corresponding to a same subframe while ensuring that a quantity of half-duplex collisions is less than the maximum quantity of transmissions, so that different groups of patterns corresponding to the same subframe can be allocated to terminal devices relatively close to each other. In this way, more time domain resources can be left to be allocated to transmit ends relatively far from each other, so that the transmit ends relatively far from each other do not send signals in a same subframe, thereby reducing impact of in-band emission.

Optionally, a resource bitmap used by a first cell is different from a resource bitmap used by a second cell; or a resource bitmap used by the first cell is the same as a resource bitmap used by the second cell, and an allocation sequence of the resource bitmap used by the first cell is different from an allocation sequence of the resource bitmap used by the second cell, where the first cell is a cell corresponding to the network-side device, and the second cell is a neighboring cell of the first cell.

In this embodiment of the present invention, different resource bitmaps are allocated to different cells, or different resource allocation sequences are configured for cells using a same resource bitmap, so that time domain resources and frequency domain resources occupied by the users do not overlap, reducing a quantity of inter-cell half-duplex collisions and in-band emission interference.

Optionally, a frequency domain allocation sequence of the first cell is different from a frequency domain resource allocation sequence of the second cell. In this way, a collision can be avoided between frequency domain resources used by neighboring cells, and inter-cell interference is reduced.

Optionally, a size of a frequency domain resource corresponding to the pattern is variable. In this way, a frequency domain resource can be flexibly allocated based on a size of to-be-transmitted data.

According to a second aspect, a resource allocation device is provided, where the device includes:

a processor, configured to determine, based on a maximum quantity of transmissions of a terminal device in a scheduling period, a set including at least two groups of patterns, where the set is corresponding to a time-frequency resource pool, the time-frequency resource pool includes N subframes, each group of patterns are in a one-to-one correspondence with the N subframes, a quantity of first subframes included in each group of patterns is the same as the maximum quantity of transmissions, the first subframe is a subframe to which a frequency domain resource is allocated, and any group of patterns and any other group of patterns in the set are corresponding to a maximum of K same first subframes, where N and K are integers, N>2, and K is greater than or equal to 0 and is less than the maximum quantity of transmissions;

a receiver, configured to receive resource scheduling request messages sent by at least two terminal devices, where the resource scheduling request message is used to request the network-side device to allocate a time-frequency resource to a terminal device corresponding to the resource scheduling request message, and the time-frequency resource is used by the terminal device to perform broadcast communication, where the processor is further configured to determine a target group of patterns from the set based on the resource scheduling request messages received by the receiver, where the target group of patterns are in a one-to-one correspondence with the at least two terminal devices, and a quantity of the first subframes corresponding to the target group of patterns is equal to a maximum quantity of transmissions of the at least two terminal devices, and a transmitter, configured to separately send information about the target group of patterns determined by the processor to the at least two terminal devices.

According to the resource allocation method in this embodiment of the present invention, the network-side device determines in advance the set including the at least two groups of patterns, where the any group of patterns and the any other group of patterns in the set are corresponding to a maximum of K same transmission subframes; and the target group of patterns are selected from the set based on the scheduling request information sent by the terminal device, to be allocated to the terminal device, so that the terminal device performs broadcast communication by using a time-frequency resource corresponding to the target group of patterns. This avoids a communication failure caused when a quantity of half-duplex collisions is greater than or equal to the maximum quantity of transmissions of the terminal device.

Optionally, the processor is configured to determine the target group of patterns from the set in ascending order of values of K. In this way, a quantity of half-duplex collisions can be minimized, and a communication success rate is improved.

Optionally, the processor is configured to:

determine, based on that a quantity of the terminal devices is less than or equal to a preset value, the target group of patterns from the set in ascending order of values of K; or determine, based on that a quantity of the terminal devices is greater than the preset value, the target group of patterns from the set in descending order of values of K; or determine, based on that a quantity of the terminal devices is greater than the preset value, the target group of patterns from the set in ascending order of values of K and according to a rule of allocating a same subframe to terminal devices relatively close to each other in the terminal devices.

The resource allocation device in this embodiment of the present invention can preferentially meet, when there are a relatively small quantity of terminal devices, a requirement of reducing a quantity of half-duplex collisions, and preferentially meet, when there are a relatively large quantity of terminal devices, a requirement of scheduling as many users as possible. In addition, when there are relatively many terminal devices, the resource allocation device may allocate a same subframe to terminal devices relatively close to each other, reducing interference caused by in-band emission.

Optionally, the processor is configured to: determine a resource bitmap based on the time-frequency resource pool corresponding to the set, where the resource bitmap is corresponding to the N subframes, the resource bitmap includes a pattern corresponding to the first subframe in the set, the pattern corresponding to the first subframe is first sorted and indexed according to a time domain, and then sorted and indexed according to a frequency domain, and any group of patterns corresponding to the first subframe and any other group of patterns corresponding to the first subframe in the resource bitmap are corresponding to a maximum of K same subframes, where the maximum quantity of transmissions of the terminal device is greater than or equal to 2; and determine the target group of patterns from the resource bitmap based on the resource scheduling request messages.

In this embodiment of the present invention, a base station maximizes groups of patterns corresponding to a same subframe while ensuring that a quantity of half-duplex collisions is less than the maximum quantity of transmissions, so that different groups of patterns corresponding to the same subframe can be allocated to terminal devices relatively close to each other. In this way, more time domain resources can be left to be allocated to transmit ends relatively far from each other, so that the transmit ends relatively far from each other do not send signals in a same subframe, thereby reducing impact of in-band emission.

Optionally, a resource bitmap used by a first cell is different from a resource bitmap used by a second cell; or a resource bitmap used by the first cell is the same as a resource bitmap used by the second cell, and an allocation sequence of the resource bitmap used by the first cell is different from an allocation sequence of the resource bitmap used by the second cell, where the first cell is a cell corresponding to the device, and the second cell is a neighboring cell of the first cell.

In this embodiment of the present invention, different resource bitmaps are allocated to different cells, or different resource allocation sequences are configured for cells using a same resource bitmap, so that time domain resources and frequency domain resources occupied by the users do not overlap, reducing a quantity of inter-cell half-duplex collisions and in-band emission interference.

Optionally, a frequency domain allocation sequence of the first cell is different from a frequency domain resource allocation sequence of the resource bitmap of the second cell. In this way, a collision can be avoided between frequency domain resources used by neighboring cells, and inter-cell interference is reduced.

Optionally, a size of a frequency domain resource corresponding to the pattern is variable. In this way, a frequency domain resource can be flexibly allocated based on a size of to-be-transmitted data.

According to a third aspect, a resource allocation apparatus is provided, including units configured to perform the steps in the first aspect and the implementations of the first aspect.

According to the resource allocation method, device, and apparatus in the embodiments of the present invention, the set including the at least two groups of patterns are determined based on the maximum quantity of transmissions of the terminal device in the scheduling period, where the any group of patterns and the any other group of patterns in the set are corresponding to a maximum of K same first subframes, and K is less than the maximum quantity of transmissions of the terminal device, so as to ensure that a half-duplex collision can be avoided in at least one transmission of each terminal device in a scheduling period, and improve a success rate of information transmission. Patterns corresponding to a same subframe are allocated to terminal device relatively close to each other, so as to reduce in-band emission interference on communication between terminal devices in a cell. A size of a frequency domain resource corresponding to each pattern is variable, flexibly adapting to data packets of different sizes and improving resource utilization. Different resource bitmaps are configured for neighboring cells, or a same resource bitmap and different allocation sequences are configured for neighboring cells, so as to reduce half-duplex collisions between the neighboring cells and impact of in-band emission. Different frequency domain resource allocation sequences are configured for the neighboring cells, so as to avoid co-channel interference between the neighboring cells.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
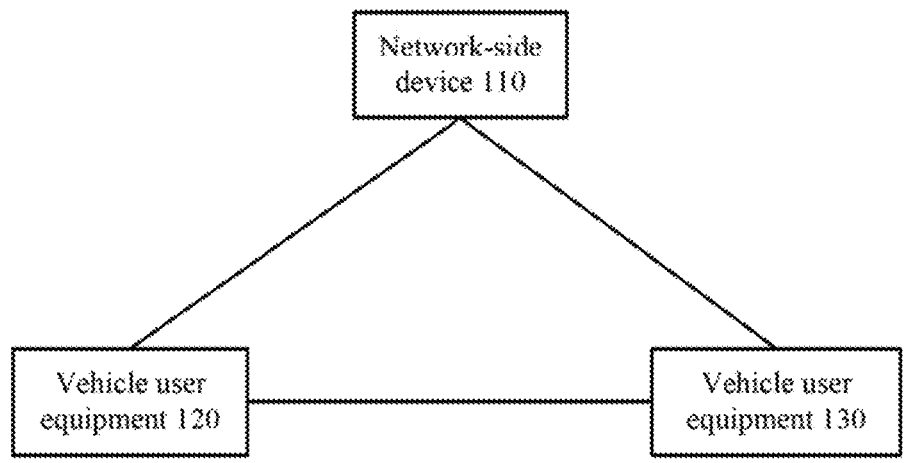
FIG. 1 is an example architecture diagram of a network of inter-vehicle communication according to an embodiment of the present invention.

For ease of understanding of the communication method in the embodiments of the present invention, the following first describes a network architecture of vehicle direct communication in the embodiments of the present invention with reference to FIG. 1. Vehicle direct communication is a type of vehicle to vehicle (V2V) communication, and V2V communication is a type of D2D communication. In the embodiments of the present invention, an example in which a terminal device is vehicle user equipment VUE is used for only illustrative description. No limitation is imposed in this embodiment of the present invention.

In FIG. 1, a network-side device 110 may configure various transmission parameters used for data transmission, for vehicle user equipment 120 and vehicle user equipment 130. The vehicle user equipment 120 may be used as a data transmitter, and directly perform VDC with the vehicle user equipment 130. Certainly, the vehicle user equipment 120 may also perform LTE communication with the network-side device, and the vehicle user equipment 120 and the vehicle user equipment 130 may also perform LTE communication with each other by using the network-side device.

In the embodiments of the present invention, the network-side device is an apparatus that is deployed in a radio access network and that provides a radio communications function for a terminal device. The network-side device may be a base station (Base Station, BS), for example, may include various forms of macro base stations, micro base stations, relay stations, and access points. A device with a base station function may have different names in systems that use different radio access technologies. For example, such a device is referred to as an evolved NodeB (NB or eNodeB for short) in an LTE network, and is referred to as a NodeB in a 3rd Generation 3G network.

It should be understood that in the embodiments of the present invention, the vehicle user equipment is a mobile communications device deployed on a vehicle. Vehicle user equipments perform direct communication with each other by using radio resources, implementing vehicle direct communication. The vehicle user equipment and the network-side device communicate with each other, implementing communication between a vehicle and the network-side device. Therefore, in the embodiments of the present invention, the vehicle user equipment may be equivalent to a vehicle in some aspects.

Figure 2:
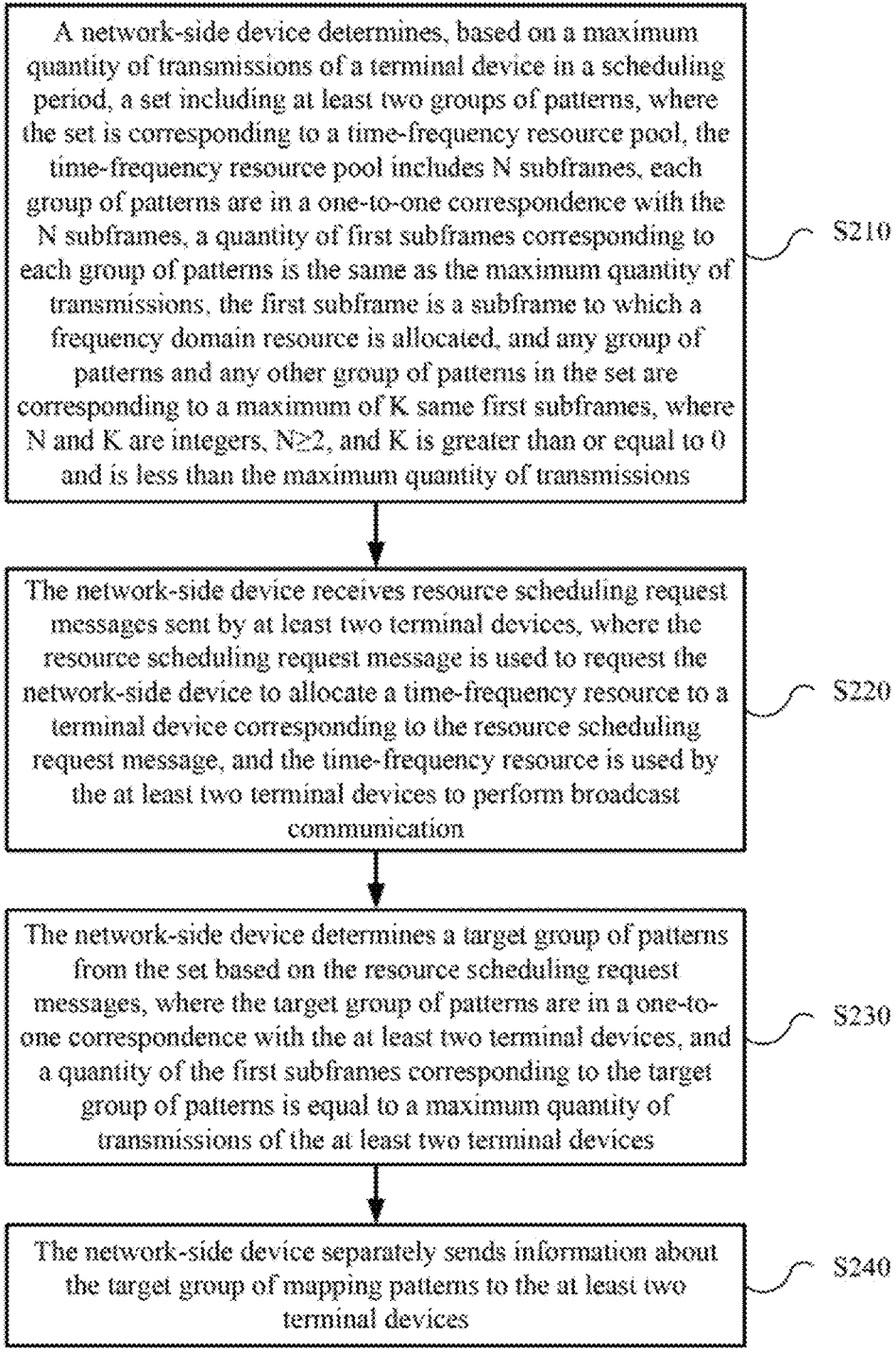
FIG. 2 is a schematic flowchart of a resource allocation method according to an embodiment of the present invention.

FIG. 2 is a schematic flowchart of a communication method according to an embodiment of the present invention. It should be understood that, FIG. 2 shows steps or operations of the communication method, but these steps or operations are only examples. In this embodiment of the present invention, other operations or variations of the operations in FIG. 2 may also be performed. In addition, each step in FIG. 2 may be performed according to a sequence different from that presented in FIG. 2, and possibly not all operations in FIG. 2 need to be performed. The method 200 includes the following steps.

S210: A network-side device determines, based on a maximum quantity of transmissions of a terminal device in a scheduling period, a set including at least two groups of patterns, where the set is corresponding to a time-frequency resource pool, the time-frequency resource pool includes N subframes, each group of patterns are in a one-to-one correspondence with the N subframes, a quantity of first subframes corresponding to each group of patterns is the same as the maximum quantity of transmissions, the first subframe is a subframe to which a frequency domain resource is allocated, and any group of patterns and any other group of patterns in the set are corresponding to a maximum of K same first subframes, where N and K are integers, N≥2, and K is greater than or equal to 0 and is less than the maximum quantity of transmissions.

S220: The network-side device receives resource scheduling request messages sent by at least two terminal devices, where the resource scheduling request message is used to request the network-side device to allocate a time-frequency resource to a terminal device corresponding to the resource scheduling request message, and the time-frequency resource is used by the at least two terminal devices to perform broadcast communication.

S230: The network-side device determines a target group of patterns from the set based on the resource scheduling request messages, where the target group of patterns are in a one-to-one correspondence with the at least two terminal devices, and a quantity of the first subframes corresponding to the target group of patterns is equal to a maximum quantity of transmissions of the at least two terminal devices.

S240: The network-side device separately sends information about the target group of patterns to the at least two terminal devices.

The network-side device may be a base station but is not limited to a base station. Usually, vehicle user equipment needs to send a resource scheduling request to the base station when the vehicle user equipment needs to perform vehicle direct communication with another vehicle user equipment. After receiving the resource scheduling request sent by the vehicle user equipment, the base station learns that a radio resource used for VDC needs to be allocated to the vehicle, and determines, from a set including groups of patterns that are determined in advance, a group of patterns allocated to the vehicle user equipment. The vehicle user equipment may perform broadcast communication based on a time-frequency resource corresponding to the group of patterns (that is, a target group of patterns) allocated by the network-side device.

The base station determines the set including at least two groups of patterns before receiving the resource scheduling request message sent by the VUE. A quantity of patterns included in each group of patterns is the same as a maximum quantity of transmissions of the current VUE in a scheduling period. Each group of patterns includes at least two patterns. The at least two patterns are in a one-to-one correspondence with at least two subframes. Each group of patterns includes at least one first subframe (that is, a subframe to which a frequency domain resource is allocated). Any group of patterns and any other group of patterns in the set of patterns are corresponding to a maximum of K same first subframes. For example, a current time-frequency resource pool includes 10 subframes, and a system specifies that the VUE performs a maximum of two transmissions in the scheduling period, therefore, each group of patterns may be corresponding to two first subframes and eight second subframes (that is, subframes to which frequency domain resources are not allocated), and each group of patterns and any group of patterns in the set may be corresponding to one same first subframe, or may be corresponding to zero same first subframes.

Each group of patterns may be allocated to one VUE, and each VUE may use a time-frequency resource corresponding to the group of patterns to perform broadcast communication with another VUE. The time-frequency resource pool corresponding to the set including groups of patterns may dynamically change based on an actual transmission requirement. The time-frequency resource pool includes at least two subframes. Specifically, a quantity of subframes included in the time-frequency resource pool may be determined based on an SC period (that is, a scheduling period).

A half-duplex collision means that when two VUEs send information simultaneously, neither can receive information sent by the other VUE. Therefore, to eliminate impact of the half-duplex collision, different VUEs should use different subframes as much as possible, and a quantity of same subframes used by different VUEs should be less than a maximum quantity of transmissions of current VUE in the scheduling period, to ensure that at least one transmission of each VUE does not collide with transmissions of the other VUEs.

Currently, it is specified in an LTE system that a maximum quantity of transmissions of the VUE may be one, two, or four (which are indicated by one/two/four times in the following for brief description). The following separately describes the three cases in detail. It should be understood that, the following embodiments are only examples for description, and no limitation is imposed in this embodiment of the present invention.

Case 1:

When the maximum quantity of transmissions of the VUE is one, a quantity of half-duplex collisions between any two VUEs should be zero, to be specific, any group of patterns and any other group of patterns in the set including groups of patterns are corresponding to a maximum of zero same first subframes. Using an example in which the time-frequency resource pool includes 10 subframes, Table 1 shows a set of patterns when the quantity of half-duplex collisions is equal to zero and the maximum quantity of transmissions is one.

TABLE 1

| Index | 0 | 1 | 2 | 3 | 4 | 5 | 6 | 7 | 8 | 9 |
|---|---|---|---|---|---|---|---|---|---|---|
| 0 | 1 | 0 | 0 | 0 | 0 | 0 | 0 | 0 | 0 | 0 |
| 1 | 0 | 1 | 0 | 0 | 0 | 0 | 0 | 0 | 0 | 0 |
| 2 | 0 | 0 | 1 | 0 | 0 | 0 | 0 | 0 | 0 | 0 |
| 3 | 0 | 0 | 0 | 1 | 0 | 0 | 0 | 0 | 0 | 0 |
| 4 | 0 | 0 | 0 | 0 | 1 | 0 | 0 | 0 | 0 | 0 |
| 5 | 0 | 0 | 0 | 0 | 0 | 1 | 0 | 0 | 0 | 0 |
| 6 | 0 | 0 | 0 | 0 | 0 | 0 | 1 | 0 | 0 | 0 |
| 7 | 0 | 0 | 0 | 0 | 0 | 0 | 0 | 1 | 0 | 0 |
| 8 | 0 | 0 | 0 | 0 | 0 | 0 | 0 | 0 | 1 | 0 |
| 9 | 0 | 0 | 0 | 0 | 0 | 0 | 0 | 0 | 0 | 1 |

As shown in Table 1, a row of indexes indicates a group of patterns; a column index indicates a subframe; "1" in each group of patterns indicates a subframe (that is, a first subframe) to which a frequency domain resource is allocated, and the subframe may be used to transmit scheduling assignment (SA) information or/and service data (DATA); and "0" indicates a subframe (that is, a second subframe) to which no time domain resource is allocated, and the subframe cannot be used to transmit information. Selecting any two groups of patterns from Table 1 and allocating the two groups of patterns to two VUEs can avoid that a half-duplex collision occurs between the two VUEs during VDC communication.

Case 2:

When the maximum quantity of transmissions of the VUE is two, a maximum quantity of half-duplex collisions between any two VUEs is one, to be specific, any group of patterns and any other group of patterns in the set including groups of patterns are corresponding to a maximum of one same first subframe. Using an example in which the time-frequency resource pool includes 10 subframes, Table 2 shows a set of patterns when the quantity of half-duplex collisions is less than or equal to one and the maximum quantity of transmissions is two.

TABLE 2

| Index | 0 | 1 | 2 | 3 | 4 | 5 | 6 | 7 | 8 | 9 |
|---|---|---|---|---|---|---|---|---|---|---|
| 0 | 1 | 1 | 0 | 0 | 0 | 0 | 0 | 0 | 0 | 0 |
| 1 | 1 | | 1 | | | | | | | |
| 2 | 1 | | | 1 | | | | | | |
| 3 | 1 | | | | 1 | | | | | |
| 4 | 1 | | | | | 1 | | | | |
| 5 | 1 | | | | | | 1 | | | |
| 6 | 1 | | | | | | | 1 | | |
| 7 | 1 | | | | | | | | 1 | |
| 8 | 1 | | | | | | | | | 1 |
| 9 | | 1 | 1 | | | | | | | |
| 10 | | 1 | | 1 | | | | | | |
| 11 | | 1 | | | 1 | | | | | |
| 12 | | 1 | | | | 1 | | | | |
| 13 | | 1 | | | | | 1 | | | |
| 14 | | 1 | | | | | | 1 | | |
| 15 | | 1 | | | | | | | 1 | |
| 16 | | 1 | | | | | | | | 1 |
| 17 | | | 1 | 1 | | | | | | |
| 18 | | | 1 | | 1 | | | | | |
| 19 | | | 1 | | | 1 | | | | |
| 20 | | | 1 | | | | 1 | | | |
| 21 | | | 1 | | | | | 1 | | |
| 22 | | | 1 | | | | | | 1 | |
| 23 | | | 1 | | | | | | | 1 |
| 24 | | | | 1 | 1 | | | | | |
| 25 | | | | 1 | | 1 | | | | |
| 26 | | | | 1 | | | 1 | | | |
| 27 | | | | 1 | | | | 1 | | |
| 28 | | | | 1 | | | | | 1 | |
| 29 | | | | 1 | | | | | | 1 |
| 30 | | | | | 1 | 1 | | | | |
| 31 | | | | | 1 | | 1 | | | |
| 32 | | | | | 1 | | | 1 | | |
| 33 | | | | | 1 | | | | 1 | |
| 34 | | | | | 1 | | | | | 1 |
| 35 | | | | | | 1 | 1 | | | |
| 36 | | | | | | 1 | | 1 | | |
| 37 | | | | | | 1 | | | 1 | |
| 38 | | | | | | 1 | | | | 1 |
| 39 | | | | | | | 1 | 1 | | |
| 40 | | | | | | | 1 | | 1 | |
| 41 | | | | | | | 1 | | | 1 |
| 42 | | | | | | | | 1 | 1 | |
| 43 | | | | | | | | 1 | | 1 |
| 44 | | | | | | | | | 1 | 1 |

As shown in Table 2, a row of indexes indicates a group of patterns; a column index indicates a subframe; "1" in each group of patterns indicates a subframe (that is, a first subframe) to which a frequency domain resource is allocated, and the subframe may be used to transmit SA information or/and service data (DATA); and "0" indicates a subframe to which no time domain resource is allocated (for brevity, "0" in only the first row is shown), and the subframe cannot be used to transmit information. Any two groups of patterns selected from Table 2 and allocated to two VUEs are corresponding to a maximum of one same first subframe, ensuring that a quantity of half-duplex collisions occurring when any two VUEs using the set of patterns transmit information is less than the maximum quantity of transmissions, so as to avoid a communication failure caused by a half-duplex collision when the two VUEs perform VDC communication.

Case 3:

When the maximum quantity of transmissions of the VUE is four, a maximum quantity of half-duplex collisions between any two VUEs is three, to be specific, any group of patterns and any other group of patterns in the set including groups of patterns are corresponding to a maximum of three same first subframes. Using an example in which the time-frequency resource pool includes 10 subframes, Table 3 shows a set of patterns when the quantity of half-duplex collisions is less than or equal to two and the maximum quantity of transmissions is four.

TABLE 3

| Index | 0 | 1 | 2 | 3 | 4 | 5 | 6 | 7 | 8 | 9 |
|---|---|---|---|---|---|---|---|---|---|---|
| 0 | 1 | 1 | 1 | 0 | 0 | 0 | 1 | 0 | 0 | 0 |
| 1 |   | 1 | 1 | 1 |   |   |   | 1 |   |   |
| 2 |   |   | 1 | 1 | 1 |   |   |   | 1 |   |
| 3 |   |   |   | 1 | 1 | 1 |   |   |   | 1 |
| 4 | 1 |   |   |   | 1 | 1 | 1 |   |   |   |
| 5 |   | 1 |   |   |   | 1 | 1 | 1 |   |   |
| 6 |   |   | 1 |   |   |   | 1 | 1 | 1 |   |
| 7 |   |   |   | 1 |   |   |   | 1 | 1 | 1 |
| 8 | 1 |   |   |   | 1 |   |   |   | 1 | 1 |
| 9 | 1 | 1 |   |   |   | 1 |   |   |   | 1 |
| 10 | 1 | 1 |   | 1 | 1 |   |   |   |   |   |
| 11 |   | 1 | 1 |   | 1 | 1 |   |   |   |   |
| 12 |   |   | 1 | 1 |   | 1 | 1 |   |   |   |
| 13 |   |   |   | 1 | 1 |   | 1 | 1 |   |   |
| 14 |   |   |   |   | 1 | 1 |   | 1 | 1 |   |
| 15 |   |   |   |   |   | 1 | 1 |   | 1 | 1 |
| 16 | 1 |   |   |   |   |   | 1 | 1 |   | 1 |
| 17 | 1 | 1 |   |   |   |   |   | 1 | 1 |   |
| 18 |   | 1 | 1 |   |   |   |   |   | 1 | 1 |
| 19 | 1 |   | 1 | 1 |   |   |   |   |   | 1 |
| 20 | 1 |   | 1 |   | 1 |   | 1 |   |   |   |
| 21 |   | 1 |   | 1 |   | 1 |   | 1 |   |   |
| 22 |   |   | 1 |   | 1 |   | 1 |   | 1 |   |
| 23 | 1 |   |   | 1 |   | 1 |   | 1 |   |   |
| 24 |   | 1 |   |   | 1 |   | 1 |   | 1 |   |
| 25 |   |   | 1 |   |   | 1 |   | 1 |   | 1 |
| 26 | 1 |   |   | 1 |   |   | 1 |   | 1 |   |
| 27 |   | 1 |   |   | 1 |   |   | 1 |   | 1 |
| 28 | 1 |   | 1 |   |   | 1 |   |   | 1 |   |
| 29 |   | 1 |   | 1 |   |   | 1 |   |   | 1 |

As shown in Table 3, a row of indexes indicates a group of patterns; a column index indicates a subframe: "1" in each group of patterns indicates a subframe (that is, a first subframe) to which a frequency domain resource is allocated, and the subframe may be used to transmit SA information or/and service data (DATA); and "0" indicates a subframe to which no time domain resource is allocated (for brevity, "0" in only the first row is shown), and the subframe cannot be used to transmit information. Any two groups of patterns selected from Table 3 and allocated to two VUEs are corresponding to a maximum of two same first subframes, ensuring that a quantity of half-duplex collisions occurring when any two VUEs using the set of patterns transmit information is less than the maximum quantity of transmissions, so as to avoid a communication failure caused by a half-duplex collision when the two VUEs perform VDC communication.

The foregoing embodiments are only examples, and no limitation is imposed in this embodiment of the present invention. For example, the resource pool may alternatively include another quantity of subframes, and a set of patterns may alternatively be determined when the maximum quantity of transmissions is two and the quantity of half-duplex collisions is equal to zero, and a set of patterns may alternatively be determined when the maximum quantity of transmissions is four and the quantity of half-duplex collisions is less than or equal to three.

In the method 200, the base station may adaptively select a quantity of transmissions. When network resource utilization and network load are less than preset thresholds, a set of patterns (for example, the set of patterns shown in Table 3) for four transmissions may be used. When network resource utilization and network load are greater than or equal to preset thresholds, a set of patterns (for example, the set of patterns shown in Table 2) for two transmissions may be used. After determining the set of patterns to be used, the base station may notify VUE of a maximum quantity of transmissions and a to-be-used target group of patterns that are in this scheduling period through downlink physical control information (DCI).

Alternatively, the base station may adaptively select, based on a quantity of to-be-scheduled users in a current cell, a suitable group of patterns for dynamic resource allocation. For example, a current allocable time-frequency resource pool includes 10 subframes, a maximum quantity of transmissions of each VUE is four, and a maximum quantity of half-duplex collisions allowed in the system is two, and therefore the base station may select a group of patterns from the set of patterns shown in Table 3 and allocate the group of patterns to the VUE. When a quantity of VUEs in the cell is two, the base station may select, from Table 3, groups of patterns that do not collide in time domain. When a quantity of VUEs in the cell is greater than two and less than and equal to five, the base station may select, from Table 3, groups of patterns that collide once in time domain. When a quantity of VUEs in the cell is greater than five, the base station may select, from Table 3, groups of patterns that collide twice in time domain.

Alternatively, the base station may adaptively select a frequency-hopping or non-frequency-hopping (resource-utilization-first) frequency domain resource allocation scheme based on an interference level. If the first scheme is selected, anti-interference performance is relatively good in a channel changing scenario. If the second scheme is selected, a relatively large quantity of users can be scheduled when a resource pool is the same as that in the frequency-hopping or non-frequency-hopping frequency domain resource allocation scheme, and resource utilization can be improved. The following separately describes the two cases in detail.

(a). Frequency-Hopping-First Resource Allocation Scheme

Step 1: At each scheduling moment, the base station adaptively selects a set of patterns based on a quantity of users in a to-be-scheduled user queue.

Step 2: The base station traverses the to-be-scheduled user queue, selects an idle group of patterns in the set of patterns, and performs resource allocation according to a frequency-hopping-first principle. When no set of patterns meet a requirement of a frequency domain because the frequency domain is limited (for example, a frequency domain bandwidth corresponding to a current pattern cannot meet a transmission requirement because a data packet is relatively large), the user is put into a candidate user queue.

In step 2, if a bandwidth of a frequency domain resource used by VUE is greater than or equal to half of a service data transmission bandwidth, frequency-hopping allocation may not be performed on the VUE, and the VUE may be put into the candidate user queue. Frequency hopping may be performed according to an existing protocol of the LTE system, or may be performed in a manner that frequency domain resources corresponding to two adjacent subframes do not overlap or do not completely overlap.

Step 3: The base station traverses the candidate user queue, selects an idle group of patterns in the set of patterns, and performs resource allocation on users (that is, users meeting a non-frequency-hopping principle) left after frequency-hopping allocation is completed. In time-frequency resources corresponding to the idle group of patterns, if no idle frequency domain resource in time domain can be allocated to a user, or when there is no idle pattern currently and a time-frequency resource reuse condition is not met among users, the user is not scheduled any more in the scheduling period, and is to be scheduled in a next scheduling period.

Step 4: The base station traverses a user queue to which no time-frequency resource is allocated, and selects an idle resource of a resource size required by a user, for resource allocation, where the idle resource is an unoccupied resource other than the time-frequency resources corresponding to the patterns.

(b) Resource-Utilization-First Resource Allocation Scheme

Step 1: At each scheduling moment, the base station adaptively selects a set of patterns based on a quantity of users in a to-be-scheduled user queue.

Step 2: The base station traverses the to-be-scheduled user queue, selects an unallocated group of patterns in. the set of patterns, performs resource allocation according to a non-frequency-hopping-first principle, and puts an unscheduled user into a candidate user queue.

The non-frequency-hopping-first principle means that an idle frequency domain resource meeting a condition (to be specific, meeting a bandwidth required for transmitting data) is looked for in frequency domain based on a time domain indication (that is, a column index number) in the set of patterns and according to a sequential order of indexes.

Step 3: The base station traverses the candidate user queue, and selects an idle resource of a resource size required by a user, for resource allocation, where the idle resource is an unoccupied resource other than time-frequency resources corresponding to the patterns.

According to the resource allocation method 200 provided in this embodiment of the present invention, the base station determines, based on the maximum quantity of transmissions of the VUE in the scheduling period, the set including the at least two groups of patterns, where the any group of patterns and the any other group of patterns in the set are corresponding to a maximum of K same first subframes, and K is less than the maximum quantity of transmissions of the VUE, so as to ensure that a half-duplex collision can be avoided in at least one transmission of each VUE in a scheduling period, and improve a success rate of information transmission. In addition, the base station may adaptively select a quantity of transmissions based on a network load status, or may adaptively select, based on a quantity of to-be-scheduled users in the current cell, a suitable group of patterns for dynamic resource allocation, or may adaptively select a frequency-hopping frequency domain resource allocation scheme or a non-frequency-hopping frequency domain resource allocation scheme based on an interference level, so as to improve utilization of the time-frequency resource pool corresponding to the set of patterns.

In the LTE system, when the user sends information by using a frequency band allocated by the system, due to in-band emission, some interference is inevitably caused to a user sending information by using another frequency band, and consequently, demodulation performance of a receive end degrades. For example, currently, there are three users: A, B, and C, A and B are transmit ends, and C is a receive end. A distance between A and C is fixed, and A and C can normally communicate. When B is relatively close to A, B is also relatively close to C. In this case, C can still better demodulate a signal sent by B even if impact of in-band emission exists. When B is relatively far from A and B is also relatively far from C, a power of a signal that is sent by B and that is received by C decreases and demodulation performance degrades. In this case, if A and B send signals simultaneously, impact of in-band emission of the signal sent by A on the signal sent by B cannot be ignored. In one solution, different time domain resources are allocated to transmit ends relatively far from each other. In the case of limited time domain resources, a same subframe may be first allocated to transmit ends relatively close to each other for transmission, and therefore more time domain resources can be left to be allocated to transmit ends relatively far from each other, so that the transmit ends relatively far from each other do not send signals in a same subframe, thereby reducing impact of in-band emission on VDC.

Optionally, in the method 200, the determining, by the network-side device, the target group of patterns from the set includes:

determining, by the network-side device, the target group of patterns from the set in ascending order of values of K.

The base station may determine the target group of patterns from the set shown in Table 2 or Table 3 in ascending order of the value of K, so that a quantity of half-duplex collisions between different VUEs is minimized.

Optionally, the determining, by the network-side device, the target group of patterns from the set includes:

determining, by the network-side device based on that a quantity of the terminal devices is less than or equal to a preset value, the target group of patterns from the set in ascending order of values of K; or determining, by the network-side device based on that a quantity of the terminal devices is greater than a preset value, the target group of patterns from the set in descending order of values of K; or determining, by the network-side device based on that a quantity of the terminal devices is greater than the preset value, the target group of patterns from the set in ascending order of values of K and according to a rule of allocating a same subframe to VUEs relatively close to each other in the terminal devices.

In this embodiment of the present invention, for example, the current resource pool includes 10 subframes, a maximum quantity of transmissions allowed in the system is two, and a maximum quantity of half-duplex collisions is one. The base station may determine the target group of patterns from the set shown in Table 2, and may preset a preset value of a quantity of VUEs, for example, the preset value may be 5. If a quantity of VUEs currently to be scheduled is less than or equal to five, the base station may preferentially allocate a target group of patterns with zero half-duplex collisions (namely, a minimum value of K). In this way, a possibility of a half-duplex collision between different VUEs is minimized. If a quantity of VUEs currently to be scheduled is greater than five, the base station may preferentially allocate a target group of patterns with one half-duplex collision (namely, a maximum value of K). In this way, a same subframe may be allocated to VUEs relatively close to each other, and impact of in-band emission is reduced. Optionally, if a quantity of VUEs currently to be scheduled is greater than five, for example, a quantity of VUEs currently to be scheduled is nine, the base station may allocate groups of patterns whose row index numbers are {0, 9, 17, 24, 30, 35, 39, 42, 44} in Table 2 to the nine VUEs, thereby reducing half-duplex collisions and minimizing interference caused by in-band emission.

Optionally, before the network-side device receives the scheduling request messages, the method 200 further includes:

S211: The network-side device determines a resource bitmap based on the time-frequency resource pool corresponding to the set, where the resource bitmap is corresponding to the N subframes, the resource bitmap includes all patterns corresponding to the first subframe in the set, the patterns corresponding to the first subframe are first sorted and indexed according to a time domain, and then sorted and indexed according to a frequency domain, and any group of patterns corresponding to the first subframe and any other group of patterns corresponding to the first subframe in the resource bitmap are corresponding to a maximum of K same subframes, where the maximum quantity of transmissions of the terminal device is greater than or equal to 2.

The determining, by the network-side device, a target group of patterns from the set based on the resource scheduling request messages includes:

S231: The network-side device determines the target group of patterns from the resource bitmap based on the resource scheduling request messages.

To reduce in-band emission interference while ensuring that a quantity of half-duplex collisions is less than the maximum quantity of transmissions, the time-frequency resource pool corresponding to the set of patterns needs to be re-sorted and indexed, so that VUEs relatively close to each other can use a same subframe for transmission as much as possible. Using the set of patterns shown in Table 2 as an example, the resource pool corresponding to the set of patterns in Table 2 includes time-frequency resources corresponding to 45 groups of patterns (a total of 90 patterns). The 45 groups of patterns are re-sorted and indexed, to maximize groups of patterns corresponding to a same subframe while ensuring that the quantity of half-duplex collisions is less than the maximum quantity of transmissions, so that different groups of patterns corresponding to the same subframe can be allocated to VUEs relatively close to each other. In this way, more time-frequency resources can be left to be allocated to transmit ends relatively far from each other, so that the transmit ends relatively far from each other do not send signals in a same subframe, thereby reducing impact of in-band emission on VDC. Table 4 shows a resource bitmap (bitmap) obtained after re-sorting and indexing based on the set of patterns shown in Table 2.

TABLE 4

| 20 | 31 | 36 | 39 | 44 | 24 | 28 | 34 | 43 | 41 |
|----|----|----|----|----|----|----|----|----|----|
| 21 | 32 | 37 | 40 |    | 25 | 29 | 35 | 42 |    |
| 22 | 33 | 38 |    |    | 26 | 30 |    |    |    |
| 23 |    |    |    |    | 27 |    |    |    |    |
| 0  | 1  | 2  | 3  | 4  | 0  | 4  | 8  | 12 | 16 |
| 5  | 6  | 7  | 8  | 9  | 1  | 5  | 9  | 13 | 17 |
| 10 | 11 | 12 | 13 | 14 | 2  | 6  | 10 | 14 | 18 |
| 15 | 16 | 17 | 18 | 19 | 3  | 7  | 11 | 15 | 19 |
| 41 | 20 | 31 | 36 | 39 | 44 | 24 | 28 | 34 | 43 |
|    | 42 | 21 | 32 | 37 |    | 40 | 25 | 29 | 35 |
|    |    | 22 | 33 |    |    |    | 38 | 26 | 30 |
|    |    |    | 23 |    |    |    |    |    | 27 |

In the resource bitmap shown in Table 4, the 45 groups of patterns are divided into two pans, which are used to transmit SA information and service data, respectively. The first part of resource patterns are first horizontally and then vertically sorted, and the first part of resource patterns are indexed as 0-19. The second part of resource patterns are first vertically and then horizontally sorted, and the second part of resource patterns are indexed as 20-44. Each column in the resource bitmap is corresponding to one subframe, and each index is corresponding to a frequency domain resource. The foregoing embodiment is only an example, and no limitation is imposed in this embodiment of the present invention. Any sorting method that can maximize groups of patterns corresponding to a same subframe while ensuring that a quantity of half-duplex collisions is less than the maximum quantity of transmissions falls within the protection scope of the present invention.

When determining, based on the resource bitmap, a group of patterns to be allocated to the VUE, the base station may determine an allocation sequence based on a quantity of VUEs to be allocated. When there are relatively few users, the base station may first allocate a group of patterns with a minimum value of K (namely, a minimum quantity of half-duplex collisions), to first ensure that the users do not collide with each other in time domain, and then allocate a frequency domain resource. When there are relatively many users, the base station may perform allocation based on a pre-allocated group of patterns, and after a group of patterns with a minimum value of K is allocated, the base station then preferentially allocates a group of patterns corresponding to a same subframe to VUEs relatively close to each other. For example, the base station may preferentially allocate a group of patterns with zero half-duplex collisions in the resource bitmap shown in Table 4 to VUE, and then allocate the remaining groups of patterns with one half-duplex collision to relatively close VUE, so as to reduce interference caused by in-band emission while avoiding a half-duplex collision.

The foregoing describes in detail the method for avoiding half-duplex collisions and interference caused by in-band emission in a cell. The following describes in detail an inter-cell interference coordination method provided in the embodiments of the present invention.

Optionally, the method 200 further includes:

a resource bitmap used by a first cell is different from a resource bitmap used by a second cell; or a resource bitmap used by the first cell is the same as a resource bitmap used by the second cell, and an allocation sequence of the resource bitmap used by the first cell is different from an allocation sequence of the resource bitmap used by the second cell, where the first cell is a cell corresponding to the network-side device, and the second cell is a neighboring cell of the first cell.

One network-side device may be corresponding to a plurality of cells, or may be corresponding to one cell (to be specific, the first cell; and when the network-side device is corresponding to a plurality of cells, any one of the plurality of cells may be referred to as the "first cell"). The neighboring cell of the first cell may be a cell corresponding to the network-side device, or may be a cell corresponding to another network-side device. To reduce inter-cell interference, time domain resources and frequency domain resources occupied by the users should not overlap as much as possible, to be specific, a resource used by a current cell (namely, the first cell) user and a resource used by a neighboring cell (namely, the second cell) user are orthogonal in time domain and frequency domain as much as possible. When there are relatively few VUEs in neighboring cells, a static interference coordination policy may be used, for example, different resource bitmaps are used for different cells. When there are relatively many VUEs in neighboring cells, a random function may be used on a basis of a static interference coordination policy, so that different time domain resources are allocated to VUEs in different cells.

Before the resource is allocated, the cell may be first divided based on different scenarios. For example, in a scenario such as a city or a highway, the cell is divided into N types. A physical cell (cell) identifier (ID) number is a cell ID. All cell ID numbers modulo N to obtain ID numbers of the N types of cells.

In a city scenario, the cell may be divided into three types of cells: A, B, and C, and N=3.

The type A of cell: Mod (Cell ID, N)=0.
The type B of cell: Mod (Cell ID, N)=1.
The type C of cell: Mod (Cell ID, N)=2.

In a highway scenario, the cell may be divided into two types of cells: A and B, and N=2.

The type A of cell: Mod (Cell ID, N)=0.
The type B of cell: Mod (Cell ID, N)=1.

After the cell is divided, resource bitmaps used by different cells may be configured. Using the three types of cells as an example, time domain resources used by different cells may be configured by using the following method. Each type of cell may include a plurality of cells, but every two neighboring cells are different types of cells, thereby ensuring that resource bitmaps used by neighboring cells are different, or resource bitmaps used by neighboring cells are the same but allocation sequences are different.

(a). Different cells use a same resource bitmap.

For example, if the A type of cell, the B type of cell, and the C type of cell all use the resource bitmap shown in Table 4, the A type of cell may allocate groups of patterns based on indexes 0-19; the B type of cell allocates groups of patterns based on indexes 19-0; and the C type of cell may allocate groups of patterns based on the following index sequence: {9, 10, 8, 11, 7, 12, 6, 13, 5, 14, 4, 15, 3, 16, 2, 17, 1, 18, 0, 0, 19}. That is, index sequences for different cells to allocate groups of patterns are different, thereby avoiding that neighboring cells use a same resource bitmap, and reducing inter-cell interference.

(b). Different Cells Use Different Resource Bitmaps.

Figure 5:
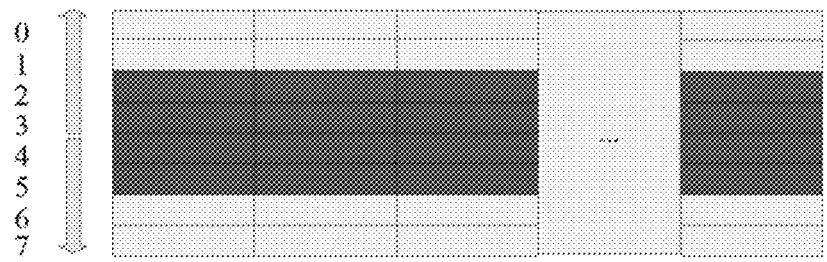
FIG. 5 is a schematic diagram of still another frequency domain resource allocation method according to an embodiment of the present invention.
Figure 6:
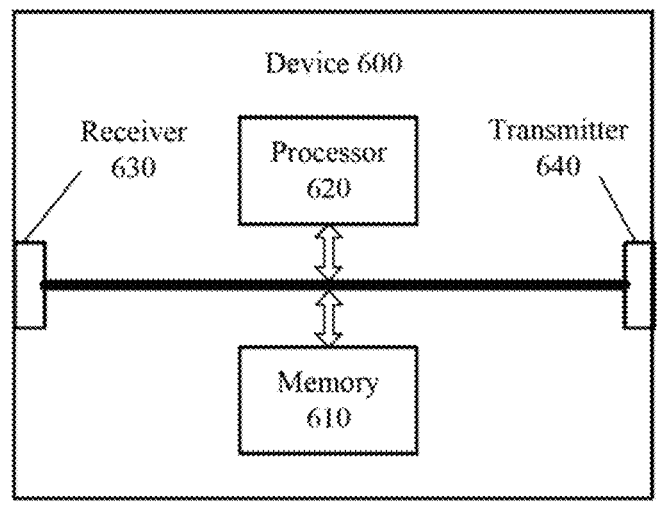
FIG. 6 is a schematic diagram of a resource allocation device according to an embodiment of the present invention.
Figure 7:
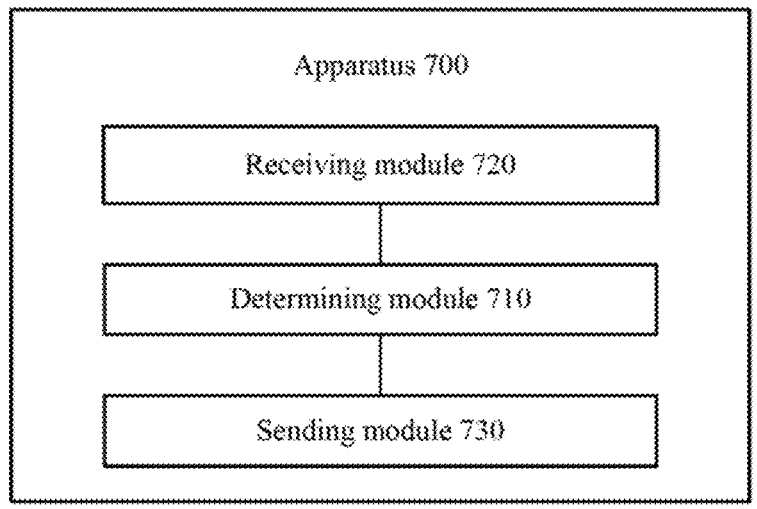
FIG. 7 is a schematic diagram of a resource allocation apparatus according to an embodiment of the present invention.

Different cells may use different resource bitmaps to reduce inter-cell interference. To ensure a minimum quantity of half-duplex collisions in a cell and minimum in-band emission interference, global offset may be performed on the resource bitmap shown in Table 4 to obtain different resource bitmaps. For example, for the type A of cell, the entire resource pool bitmap is circularly right shifted by zero subframes (namely, offset=0), as shown in FIG. 5;

for the type B of cell, the entire resource pool bitmap is circularly right shifted by five subframes (namely, offset=5), as shown in FIG. 6; and for the type C of cell, the entire resource pool bitmap is circularly right shifted by eight subframes (namely, offset=8), as shown in FIG. 7.

TABLE 5

| 20 | 31 | 36 | 39 | 44 | 24 | 28 | 34 | 43 | 41 |
|---|---|---|---|---|---|---|---|---|---|
| 21 | 32 | 37 | 40 | | 25 | 29 | 35 | 42 | |
| 22 | 33 | 38 | | | 26 | 30 | | | |
| 23 | | | | | 27 | | | | |
| 0 | 1 | 2 | 3 | 4 | 0 | 4 | 8 | 12 | 16 |
| 5 | 6 | 7 | 8 | 9 | 1 | 5 | 9 | 13 | 17 |
| 10 | 11 | 12 | 13 | 14 | 2 | 6 | 10 | 14 | 18 |
| 15 | 16 | 17 | 18 | 19 | 3 | 7 | 11 | 15 | 19 |
| 41 | 20 | 31 | 36 | 39 | 44 | 24 | 28 | 34 | 43 |
| | 42 | 21 | 32 | 37 | | 40 | 25 | 29 | 35 |
| | | 22 | 33 | | | | 38 | 26 | 30 |

TABLE 5-continued

| 23 | | | | | 27 | | | | |
|---|---|---|---|---|---|---|---|---|---|

TABLE 6

| 24 | 28 | 34 | 43 | 41 | 20 | 31 | 36 | 39 | 44 |
|---|---|---|---|---|---|---|---|---|---|
| 25 | 29 | 35 | 42 | | 21 | 32 | 37 | 40 | |
| 26 | 30 | | | | 22 | 33 | 38 | | |
| 27 | | | | | 23 | | | | |
| 0 | 4 | 8 | 12 | 16 | 0 | 1 | 2 | 3 | 4 |
| 1 | 5 | 9 | 13 | 17 | 5 | 6 | 7 | 8 | 9 |
| 2 | 6 | 10 | 14 | 18 | 10 | 11 | 12 | 13 | 14 |
| 3 | 7 | 11 | 15 | 19 | 15 | 16 | 17 | 18 | 19 |
| 44 | 24 | 28 | 34 | 43 | 41 | 20 | 31 | 36 | 39 |
| | 40 | 25 | 29 | 35 | | 42 | 21 | 32 | 37 |
| | | 38 | 26 | 30 | | | | 22 | 33 |
| | | | 27 | | | | | | 23 |

TABLE 7

| 36 | 39 | 44 | 24 | 28 | 34 | 43 | 41 | 20 | 31 |
|---|---|---|---|---|---|---|---|---|---|
| 37 | 40 | | 25 | 29 | 35 | 42 | | 21 | 32 |
| 38 | | | 26 | 30 | | | | 22 | 33 |
| | | | 27 | | | | | 23 | |
| 2 | 3 | 4 | 0 | 4 | 8 | 12 | 16 | 0 | 1 |
| 7 | 8 | 9 | 1 | 5 | 9 | 13 | 17 | 5 | 6 |
| 12 | 13 | 14 | 2 | 6 | 10 | 14 | 18 | 10 | 11 |
| 17 | 18 | 19 | 3 | 7 | 11 | 15 | 19 | 15 | 16 |
| 31 | 36 | 39 | 44 | 24 | 28 | 34 | 43 | 41 | 20 |
| 21 | 32 | 37 | | 40 | 25 | 29 | 35 | | 42 |
| | 22 | 33 | | | 38 | 26 | 30 | | |
| | | 23 | | | | 27 | | | |

The foregoing embodiments are only examples, and no limitation is imposed in this embodiment of the present invention. The offset of the type A of cell, the offset of the type B of cell, and the offset of the type C of cell may alternatively be other values.

Optionally, the random function may further be used to perform random sorting on each column of patterns.

Optionally, different cells may alternatively use resource bitmaps corresponding to different resource pools.

Therefore, according to the resource allocation method provided in this embodiment of the present invention, half-duplex collisions between different cells can be minimized, and half-duplex collisions and in-band emission interference in each cell can be minimized, improving network PDR performance.

Optionally, a frequency domain allocation sequence of the first cell is different from a frequency domain resource allocation sequence of the second cell.

Still using the type A of cell, the type B of cell, and the type C of cell as an example, frequency domain resources used by different cells may be configured by using the following method. Patterns of different colors in a figure represent patterns allocated to different types of data.

Figure 3:
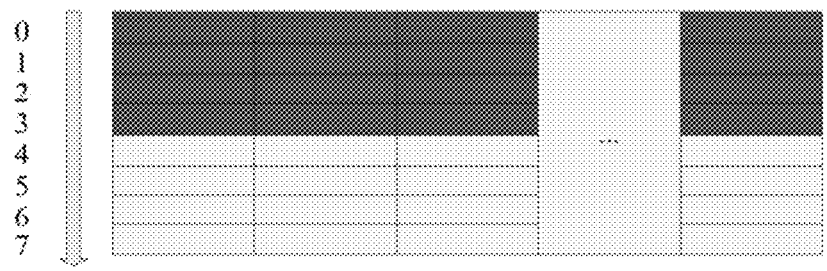
FIG. 3 is a schematic diagram of a frequency domain resource allocation method according to an embodiment of the present invention.

The type A of cell: Dynamic resource allocation is performed on users in the type A of cell based on the resource bitmap shown in Table 5. Dynamic resource allocation is performed in ascending order of a frequency domain index in frequency domain, as shown in FIG. 3.

Figure 4:
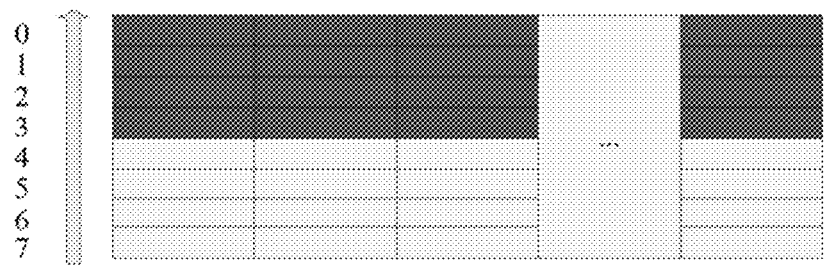
FIG. 4 is a schematic diagram of another frequency domain resource allocation method according to an embodiment of the present invention.

The type B of cell: Dynamic resource allocation is performed on users in the type B of cell based on the resource bitmap shown in Table 6. Dynamic resource allocation is performed in descending order of an index in frequency domain, as shown in FIG. 4.

The type C of cell: Frequency domain resources are sequentially allocated to users in the type C of cell, starting from the middle to the both ends by using the method shown in Table 7.

The base station may adaptively perform frequency hopping based on a quantity of users to allocate the frequency domain resources.

For example, a quantity of users supporting one/two/four transmissions in time domain is M (for four transmissions, M is selected to be 5; and for one/two transmissions, M is selected to be 10). When the quantity of users is less than M, resources may be allocated symmetrically from the middle of a resource pool.

When a quantity of to-be-scheduled users is greater than M, dynamic resource allocation is performed randomly in the manner that is for the type A of cell or the type B of cell. This can ensure that frequency bands of different cells stagger, reducing co-channel interference between VUEs.

Optionally, a size of a frequency domain resource corresponding to the pattern is variable.

An index sequence of each cell resource bitmap indicates a basis for performing dynamic resource allocation for a cell based on a to-be-scheduled queue. Each time domain of the resource bitmap indicates the subframe in which a user allocates a frequency domain resource. One or two resource blocks (RB) may be allocated to the SA information, and a quantity of RBs allocated to the service data dynamically changes, and a maximum quantity of RBs is a maximum value of a quantity of RBs corresponding to a supported frequency domain bandwidth.

According to the resource allocation method provided in this embodiment of the present invention, a resource quantification scheme, to be specific, a minimum granularity for user scheduling each time is N (N≥1) RBs, so that an RB matching a size of a data packet is allocated based on the size of the data packet, improving resource allocation flexibility and utilization.

According to the resource allocation method 200 provided in this embodiment of the present invention, the set including the at least two groups of patterns are determined based on the maximum quantity of transmissions of the VUE in the scheduling period, where the any group of patterns and the any other group of patterns in the set are corresponding to a maximum of K same first subframes, and K is less than the maximum quantity of transmissions of the VUE, so as to ensure that a half-duplex collision can be avoided in at least one transmission of each VUE in a scheduling period, and improve a success rate of information transmission. Patterns corresponding to a same subframe are allocated to VUEs relatively close to each other, so as to reduce in-band emission interference on communication between VUEs in a cell. A size of a frequency domain resource corresponding to each pattern is variable, flexibly adapting to data packets of different sizes and improving resource utilization. Different resource bitmaps are configured for neighboring cells, or a same resource bitmap and different allocation sequences are configured for neighboring cells, so as to reduce half-duplex collisions between the neighboring cells and impact of in-band emission. Different frequency domain resource allocation sequences are configured for the neighboring cells, so as to avoid co-channel interference between the neighboring cells.

The foregoing describes the resource allocation method provided in the embodiments of the present invention with reference to FIG. 2 to FIG. 5. The following describes a resource allocation device provided in the embodiments of the present invention with reference to FIG. 6.

FIG. 6 is a schematic structural diagram of a resource allocation device 600 according to an embodiment of the present invention. It should be understood that a structure shown in FIG. 6 is only an example. A network-side device in the embodiments of the present invention may further include another module or unit, or include modules with functions similar to those of modules in FIG. 6, or not necessarily include all modules in FIG. 6.

It should be understood that the device 600 can perform steps performed by the network-side device in FIG. 2. The device 600 includes a memory 610, a processor 620, a receiver 630, and a transmitter 640.

The memory 610 is configured to store a program.

The processor 620 is configured to determine, based on a maximum quantity of transmissions of a terminal device in a scheduling period, a set including at least two groups of patterns, where the set is corresponding to a time-frequency resource pool, the time-frequency resource pool includes N subframes, each group of patterns are in a one-to-one correspondence with the N subframes, a quantity of first subframes included in each group of patterns is the same as the maximum quantity of transmissions, the first subframe is a subframe to which a frequency domain resource is allocated, and any group of patterns and any other group of patterns in the set are corresponding to a maximum of K same first subframes, where N and K are integers, N≥2. and K is greater than or equal to 0 and is less than the maximum quantity of transmissions.

The receiver 630 is configured to receive resource scheduling request messages sent by at least two terminal devices, where the resource scheduling request message is used to request the network-side device to allocate a time-frequency resource to a terminal device corresponding to the resource scheduling request message, and the time-frequency resource is used by the terminal device to perform broadcast communication.

The processor 620 is further configured to determine a target group of patterns from the set based on the resource scheduling request messages received by the receiver 630, where the target group of patterns are in a one-to-one correspondence with the at least two terminal devices, and a quantity of the first subframes corresponding to the target group of patterns is equal to a maximum quantity of transmissions of the at least two terminal devices.

The transmitter 640 is configured to separately send information about the target group of patterns determined by the processor 620 to the at least two terminal devices.

The resource allocation device 600 provided in this embodiment of the present invention determines, based on the maximum quantity of transmissions of VUE in the scheduling period, the set including the at least two groups of patterns, where the any group of patterns and the any other group of patterns in the set are corresponding to a maximum of K same first subframes, and K is less than the maximum quantity of transmissions of the VUE, so as to ensure that a half-duplex collision can be avoided in at least one transmission of each VUE in a scheduling period, and improve a success rate of information transmission. In addition, the device 600 may adaptively select a quantity of transmissions based on a network load status, or may adaptively select, based on a quantity of to-be-scheduled users in a current cell, a suitable group of patterns for dynamic resource allocation, or may adaptively select a frequency-hopping frequency domain resource allocation scheme or a non-frequency-hopping frequency domain resource allocation scheme based on an interference level, so as to improve utilization of the time-frequency resource pool corresponding to the set of patterns.

It should be understood that in this embodiment of the present invention, the processor 620 may be a CPU, or the processor 620 may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor or the processor may be any conventional processor, or the like.

The memory 610 may include a read-only memory and a random access memory, and provide instructions and data for the processor 620. A part of the memory 610 may further include a non-volatile random access memory. For example, the memory 610 may further store device type information.

In an implementation process, the steps of the foregoing method may be completed by an integrated logic circuit of hardware in the processor 620, or by a software instruction. The steps of the methods disclosed with reference to the embodiments of the present invention may be directly implemented by a hardware processor, or may be implemented by a combination of hardware and a software module in a processor. The software module may be located in a mature storage medium in the art, such as a random access memory, a flash memory, a read-only memory, a programmable read-only memory, an electrically erasable programmable memory, a register, or the like. The storage medium is located in the memory 610, and the processor 620 reads information in the memory 610 and implements, in combination with its hardware, the steps of the foregoing methods. To avoid repetition, no details are described herein again.

Optionally, the processor 620 is configured to determine the target group of patterns from the set in ascending order of values of K. In this way, a quantity of half-duplex collisions between different VUEs is minimized.

Optionally, the processor 620 is configured to:
determine, based on that a quantity of the terminal devices is less than or equal to a preset value, the target group of patterns from the set in ascending order of values of K; or
determine, based on that a quantity of the terminal devices is greater than the preset value, the target group of patterns from the set in descending order of values of K; or determine, based on that a quantity of the terminal devices is greater than the preset value, the target group of patterns from the set in ascending order of values of K and according to a rule of allocating a same subframe to terminal devices relatively close to each other in the terminal devices.

In this way, a quantity of half-duplex collisions can be reduced, and interference caused by in-band emission can be minimized.

Optionally, the processor 620 is configured to determine a resource bitmap based on the time-frequency resource pool corresponding to the set, where the resource bitmap is corresponding to the N subframes, the resource bitmap includes a pattern corresponding to the first subframe in the set, the pattern corresponding to the first subframe is first sorted and indexed according to a time domain, and then sorted and indexed according to a frequency domain, and any group of patterns corresponding to the first subframe and any other group of patterns corresponding to the first subframe in the resource bitmap are corresponding to a maximum of K same subframes, where the maximum quantity of transmissions of the terminal device is greater than or equal to 2; and
determine the target group of patterns from the resource bitmap based on the resource scheduling request messages.

In this embodiment of the present invention, a base station maximizes groups of patterns corresponding to a same subframe while ensuring that a quantity of half-duplex collisions is less than the maximum quantity of transmissions, so that different groups of patterns corresponding to the same subframe can be allocated to VUEs relatively close to each other. In this way, more time domain resources can be left to be allocated to transmit ends relatively far from each other, so that the transmit ends relatively far from each other do not send signals in a same subframe, thereby reducing impact of in-band emission on VDC.

Optionally, a resource bitmap used by a first cell is different from a resource bitmap used by a second cell; or
a resource bitmap used by the first cell is the same as a resource bitmap used by the second cell, and an allocation sequence of the resource bitmap used by the first cell is different from an allocation sequence of the resource bitmap used by the second cell, where the first cell is a cell corresponding to the device, and the second cell is a neighboring cell of the first cell.

In this embodiment of the present invention, different resource bitmaps are allocated to different cells, or different resource allocation sequences are configured for cells using a same resource bitmap, so that time domain resources and frequency domain resources occupied by the users do not overlap, reducing a quantity of inter-cell half-duplex collisions and in-band emission interference.

Optionally, a frequency domain allocation sequence of the first cell is different from a frequency domain resource allocation sequence of the resource bitmap of the second cell. In this way, a collision can be avoided between frequency domain resources used by neighboring cells, and inter-cell interference is reduced.

Optionally, a size of a frequency domain resource corresponding to the pattern is variable. In this way, a frequency domain resource can be flexibly allocated based on a size of to-be-transmitted data.

It should be understood that the resource allocation device 600 in this embodiment of the present invention may correspond to the network-side device in the resource allocation method 200 in the embodiments of the present invention, and the foregoing and other operations and/or functions of each module in the device 600 are intended to implement corresponding processes of each step in the method 200. For brevity, no details are described herein again.

Therefore, the resource allocation device 600 according to this embodiment of the present invention determines, based on the maximum quantity of transmissions of the VUE in the scheduling period, the set including the at least two groups of patterns, where the any group of patterns and the any other group of patterns in the set are corresponding to a maximum of K same first subframes, and K is less than the maximum quantity of transmissions of the VUE, so as to ensure that a half-duplex collision can be avoided in at least one transmission of each VUE in a scheduling period, and improve a success rate of information transmission. Patterns corresponding to a same subframe are allocated to VUEs relatively close to each other, so as to reduce in-band emission interference on communication between VUEs in a cell. A size of a frequency domain resource corresponding to each pattern is variable, flexibly adapting to data packets of different sizes and improving resource utilization. Different resource bitmaps are configured for neighboring cells, or a same resource bitmap and different allocation sequences are configured for neighboring cells, so as to reduce half-duplex collisions between the neighboring cells and impact of in-band emission. Different frequency domain resource allocation sequences are configured for the neighboring cells, so as to avoid co-channel interference between the neighboring cells.

The foregoing describes in detail the resource allocation device provided in the embodiments of the present invention with reference to FIG. 6. The following describes in detail a resource allocation apparatus provided in the embodiments of the present invention with reference to FIG. 7.

FIG. 7 is a schematic diagram of a resource allocation apparatus according to an embodiment of the present invention. As shown in FIG. 7, the apparatus 700 includes:

a determining module 710, configured to determine, based on a maximum quantity of transmissions of a terminal device in a scheduling period, a set including at least two groups of patterns, where the set is corresponding to a time-frequency resource pool, the time-frequency resource pool includes N subframes, each group of patterns are in a one-to-one correspondence with the N subframes, a quantity of first subframes corresponding to each group of patterns is the same as the maximum quantity of transmissions, the first subframe is a subframe to which a frequency domain resource is allocated, and any group of patterns and any other group of patterns in the set are corresponding to a maximum of K same first subframes, where N and K are integers, N≥2, and K is greater than or equal to 0 and is less than the maximum quantity of transmissions;

a receiving module 720, configured to receive resource scheduling request messages sent by at least two terminal devices, where the resource scheduling request message is used to request the network-side device to allocate a time-frequency resource to a terminal device corresponding to the resource scheduling request message, and the time-frequency resource is used by the at least two terminal devices to perform broadcast communication, where the determining module 710 is further configured to determine a target group of patterns from the set based on the resource scheduling request messages received by the receiving module 720, where the target group of patterns are in a one-to-one correspondence with the at least two terminal devices, and a quantity of the first subframes corresponding to the target group of patterns is equal to a maximum quantity of transmissions of the at least two terminal devices; and a sending module 730, configured to separately send information about the target group of patterns determined by the determining module 710 to the at least two terminal devices.

The resource allocation apparatus 700 provided in this embodiment of the present invention determines, based on the maximum quantity of transmissions of VUE in the scheduling period, the set including the at least two groups of patterns, where the any group of patterns and the any other group of patterns in the set are corresponding to a maximum of K same first subframes, and K is less than the maximum quantity of transmissions of the VUE, so as to ensure that a half-duplex collision can be avoided in at least one transmission of each VUE in a scheduling period, and improve a success rate of information transmission. In addition, the apparatus 700 may adaptively select a quantity of transmissions based on a network load status, or may adaptively select, based on a quantity of to-be-scheduled users in a current cell, a suitable group of patterns for dynamic resource allocation, or may adaptively select a frequency-hopping frequency domain resource allocation scheme or a non-frequency-hopping frequency domain resource allocation scheme based on an interference level, so as to improve utilization of the time-frequency resource pool corresponding to the set of patterns.

Optionally, the determining module 710 is configured to determine the target group of patterns from the set in ascending order of values of K. In this way, a quantity of half-duplex collisions between different VUEs is minimized.

Optionally, the determining module 710 is configured to:

determine, based on that a quantity of the terminal devices is less than or equal to a preset value, the target group of patterns from the set in ascending order of values of K; or determine, based on that a quantity of the terminal devices is greater than the preset value, the target group of patterns from the set in descending order of values of K; or determine, based on that a quantity of the terminal devices is greater than the preset value, the target group of patterns from the set in ascending order of values of K and according to a rule of allocating a same subframe to terminal devices relatively close to each other in the terminal devices.

In this way, a quantity of half-duplex collisions can be reduced, and interference caused by in-band emission can be minimized.

Optionally, before the receiving module 720 receives the scheduling request messages, the determining module 710 is configured to determine a resource bitmap based on the time-frequency resource pool corresponding to the set, where the resource bitmap is corresponding to the N subframes, the resource bitmap includes a pattern corresponding to the first subframe in the set, the pattern corresponding to the first subframe is first sorted and indexed according to a time domain, and then sorted and indexed according to a frequency domain, and any group of patterns corresponding to the first subframe and any other group of patterns corresponding to the first subframe in the resource bitmap are corresponding to a maximum of K same subframes, where the maximum quantity of transmissions of the terminal device is greater than or equal to 2; and the determining module 710 is further configured to determine the target group of patterns from the resource bitmap based on the resource scheduling request messages.

In this embodiment of the present invention, a base station maximizes groups of patterns corresponding to a same subframe while ensuring that a quantity of half-duplex collisions is less than the maximum quantity of transmissions, so that different groups of patterns corresponding to the same subframe can be allocated to VUEs relatively close to each other. In this way, more time domain resources can be left to be allocated to transmit ends relatively far from each other, so that the transmit ends relatively far from each other do not send signals in a same subframe, thereby reducing impact of in-band emission on VDC.

Optionally, a resource bitmap used by a first cell is different from a resource bitmap used by a second cell; or a resource bitmap used by the first cell is the same as a resource bitmap used by the second cell, and an allocation sequence of the resource bitmap used by the first cell is different from an allocation sequence of the resource bitmap used by the second cell, where the first cell is a cell corresponding to the apparatus 700, and the second cell is a neighboring cell of the first cell.

In this embodiment of the present invention, different resource bitmaps are allocated to different cells, or different resource allocation sequences are configured for cells using a same resource bitmap, so that time domain resources and frequency domain resources occupied by the users do not overlap, reducing a quantity of inter-cell half-duplex collisions and in-band emission interference.

Optionally, a frequency domain allocation sequence of the first cell is different from a frequency domain resource allocation sequence of the second cell. In this way, a collision can be avoided between frequency domain resources used by neighboring cells, and inter-cell interference is reduced.

Optionally, a size of a frequency domain resource corresponding to the pattern is variable. In this way, a frequency domain resource can be flexibly allocated based on a size of to-be-transmitted data.

It should be understood that the resource allocation apparatus 700 in this embodiment of the present invention may correspond to the network-side device in the resource allocation method 200 in the embodiments of the present invention, and the foregoing and other operations and/or functions of each module in the apparatus 700 are intended to implement corresponding processes of each step in the method 200. For brevity, no details are described herein again.

Therefore, the resource allocation apparatus 700 according to this embodiment of the present invention determines, based on the maximum quantity of transmissions of the VUE in the scheduling period, the set including the at least two groups of patterns, where the any group of patterns and the any other group of patterns in the set are corresponding to a maximum of K same first subframes, and K is less than the maximum quantity of transmissions of the VUE, so as to ensure that a half-duplex collision can be avoided in at least one transmission of each VUE in a scheduling period, and improve a success rate of information transmission. Patterns corresponding to a same subframe are allocated to VUEs relatively close to each other, so as to reduce in-band emission interference on communication between VUEs in a cell. A size of a frequency domain resource corresponding to each pattern is variable, flexibly adapting to data packets of different sizes and improving resource utilization. Different resource bitmaps are configured for neighboring cells, or a same resource bitmap and different allocation sequences are configured for neighboring cells, so as to reduce half-duplex collisions between the neighboring cells and impact of in-band emission. Different frequency domain resource allocation sequences are configured for the neighboring cells, so as to avoid co-channel interference between the neighboring cells.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected based on actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A resource allocation method, wherein the method comprises:

determining, by a network-side device based on a maximum quantity of transmissions of a terminal device in a scheduling period, a set comprising at least two groups of patterns, wherein the set is corresponding to a time-frequency resource pool, the time-frequency resource pool comprises N subframes, each group of patterns are in a one-to-one correspondence with the N subframes, a quantity of first subframes corresponding to each group of patterns is the same as the maximum quantity of transmissions, the first subframe is a subframe to which a frequency domain resource is allocated, and any group of patterns and any other group of patterns in the set are corresponding to a maximum of K same first subframes, wherein N and K are integers, N≥2, and K is greater than or equal to 0 and is less than the maximum quantity of transmissions;

receiving, by the network-side device, resource scheduling request messages sent by at least two terminal devices, wherein the resource scheduling request message is used to request the network-side device to allocate a time-frequency resource to a terminal device corresponding to the resource scheduling request message, and the time-frequency resource is used by the at least two terminal devices to perform broadcast communication;

determining, by the network-side device, a target group of patterns from the set based on the resource scheduling request messages, wherein the target group of patterns are in a one-to-one correspondence with the at least two terminal devices, and a quantity of the first subframes corresponding to the target group of patterns is equal to a maximum quantity of transmissions of the at least two terminal devices; and separately sending, by the network-side device, information about the target group of patterns to the at least two terminal devices.

2. The method according to claim 1, wherein the determining, by the network-side device, the target group of patterns from the set comprises:

determining, by the network-side device, the target group of patterns from the set in ascending order of values of K.

3. The method according to claim 1, wherein the determining, by the network-side device, the target group of patterns from the set comprises:

determining, by the network-side device based on that a quantity of the terminal devices is less than or equal to a preset value, the target group of patterns from the set in ascending order of values of K; or determining, by the network-side device based on that a quantity of the terminal devices is greater than a preset value, the target group of patterns from the set in descending order of values of K; or determining, by the network-side device based on that a quantity of the terminal devices is greater than a preset value, the target group of patterns from the set in ascending order of values of K and according to a rule of allocating a same subframe to terminal devices relatively close to each other in the terminal devices.

4. The method according to claim 1, wherein before the receiving, by the network-side device, the resource scheduling request messages, the method further comprises:

determining, by the network-side device, a resource bitmap based on the time-frequency resource pool corresponding to the set, wherein the resource bitmap is corresponding to the N subframes, the resource bitmap comprises a pattern corresponding to the first subframe in the set, the pattern corresponding to the first subframe is first sorted and indexed according to a time domain, and then sorted and indexed according to a frequency domain, and any group of patterns corresponding to the first subframe and any other group of patterns corresponding to the first subframe in the resource bitmap are corresponding to a maximum of K same subframes, wherein the maximum quantity of transmissions of the terminal device is greater than or equal to 2; and the determining, by the network-side device, a target group of patterns from the set based on the resource scheduling request messages comprises:

determining, by the network-side device, the target group of patterns from the resource bitmap based on the resource scheduling request messages.

5. The method according to claim 4, wherein a resource bitmap used by a first cell is different from a resource bitmap used by a second cell; or a resource bitmap used by a first cell is the same as a resource bitmap used by a second cell, and an allocation sequence of the resource bitmap used by the first cell is different from an allocation sequence of the resource bitmap used by the second cell, wherein the first cell is a cell corresponding to the network-side device, and the second cell is a neighboring cell of the first cell.

6. The method according to claim 5, wherein a frequency domain allocation sequence of the first cell is different from a frequency domain resource allocation sequence of the second cell.

7. The method according to claim 1, wherein a size of a frequency domain resource corresponding to the pattern is variable.

8. A resource allocation device, wherein the device comprises:

a processor, configured to determine, based on a maximum quantity of transmissions of a terminal device in a scheduling period, a set comprising at least two groups of patterns, wherein the set is corresponding to a time-frequency resource pool, the time-frequency resource pool comprises N subframes, each group of patterns are in a one-to-one correspondence with the N subframes, a quantity of first subframes comprised in each group of patterns is the same as the maximum quantity of transmissions, the first subframe is a subframe to which a frequency domain resource is allocated, and any group of patterns and any other group of patterns in the set are corresponding to a maximum of K same first subframes, wherein N and K are integers, N≥2, and K is greater than or equal to 0 and is less than the maximum quantity of transmissions;

a receiver, configured to receive resource scheduling request messages sent by at least two terminal devices, wherein the resource scheduling request message is used to request the network-side device to allocate a time-frequency resource to a terminal device corresponding to the resource scheduling request message, and the time-frequency resource is used by the terminal device to perform broadcast communication, wherein the processor is further configured to determine a target group of patterns from the set based on the resource scheduling request messages received by the receiver, wherein the target group of patterns are in a one-to-one correspondence with the at least two terminal devices, and a quantity of the first subframes corresponding to the target group of patterns is equal to a maximum quantity of transmissions of the at least two terminal devices; and a transmitter, configured to separately send information about the target group of patterns determined by the processor to the at least two terminal devices.

9. The device according to claim 8, wherein the processor is configured to determine the target group of patterns from the set in ascending order of values of K.

10. The device according to claim 8, wherein the processor is configured to:

determine, based on that a quantity of the terminal devices is less than or equal to a preset value, the target group of patterns from the set in ascending order of values of K; or determine, based on that a quantity of the terminal devices is greater than the preset value, the target group of patterns from the set in descending order of values of K; or determine, based on that a quantity of the terminal devices is greater than the preset value, the target group of patterns from the set in ascending order of values of K and according to a rule of allocating a same subframe to terminal devices relatively close to each other in the terminal devices.

11. The device according to claim 8, wherein before the receiver receives the scheduling request messages, the processor is configured to determine a resource bitmap based on the time-frequency resource pool corresponding to the set, wherein the resource bitmap is corresponding to the N subframes, the resource bitmap comprises a pattern corresponding to the first subframe in the set, the pattern corresponding to the first subframe is first sorted and indexed according to a time domain, and then sorted and indexed according to a frequency domain, and any group of patterns corresponding to the first subframe and any other group of patterns corresponding to the first subframe in the resource bitmap are corresponding to a maximum of K same subframes, wherein the maximum quantity of transmissions of the terminal device is greater than or equal to 2; and the processor is further configured to determine the target group of patterns from the resource bitmap based on the resource scheduling request messages.

12. The device according to claim 11, wherein a resource bitmap used by a first cell is different from a resource bitmap used by a second cell; or a resource bitmap used by the first cell is the same as a resource bitmap used by the second cell, and an allocation sequence of the resource bitmap used by the first cell is different from an allocation sequence of the resource bitmap used by the second cell, wherein the first cell is a cell corresponding to the device, and the second cell is a neighboring cell of the first cell.

13. The device according to claim 12, wherein a frequency domain allocation sequence of the first cell is different from a frequency domain resource allocation sequence of the resource bitmap of the second cell.

14. The device according to claim 8, wherein a size of a frequency domain resource corresponding to the pattern is variable.

15. A non-transitory computer-readable storage medium that stores instructions, wherein the instructions make a method executed, the method comprises: determining, by a network-side device based on a maximum quantity of transmissions of a terminal device in a scheduling period, a set comprising at least two groups of patterns, wherein the set is corresponding to a time-frequency resource pool, the time-frequency resource pool comprises N subframes, each group of patterns are in a one-to-one correspondence with the N subframes, a quantity of first subframes corresponding to each group of patterns is the same as the maximum quantity of transmissions, the first subframe is a subframe to which a frequency domain resource is allocated, and any group of patterns and any other group of patterns in the set are corresponding to a maximum of K same first subframes, wherein N and K are integers, N≥2, and K is greater than or equal to 0 and is less than the maximum quantity of transmissions;

receiving, by the network-side device, resource scheduling request messages sent by at least two terminal devices, wherein the resource scheduling request message is used to request the network-side device to allocate a time-frequency resource to a terminal device corresponding to the resource scheduling request message, and the time-frequency resource is used by the at least two terminal devices to perform broadcast communication;

determining, by the network-side device, a target group of patterns from the set based on the resource scheduling request messages, wherein the target group of patterns are in a one-to-one correspondence with the at least two terminal devices, and a quantity of the first subframes corresponding to the target group of patterns is equal to a maximum quantity of transmissions of the at least two terminal devices, and separately sending, by the network-side device, information about the target group of patterns to the at least two terminal devices.

16. The non-transitory computer-readable storage medium according to claim 15, wherein the determining, by the network-side device, the target group of patterns from the set comprises:

determining, by the network-side device, the target group of patterns from the set in ascending order of values of K.

17. The non-transitory computer-readable storage medium according to claim 15, wherein the determining, by the network-side device, the target group of patterns from the set comprises:

determining, by the network-side device based on that a quantity of the terminal devices is less than or equal to a preset value, the target group of patterns from the set in ascending order of values of K; or determining, by the network-side device based on that a quantity of the terminal devices is greater than a preset value, the target group of patterns from the set in descending order of values of K; or determining, by the network-side device based on that a quantity of the terminal devices is greater than a preset value, the target group of patterns from the set in ascending order of values of K and according to a rule of allocating a same subframe to terminal devices relatively close to each other in the terminal devices.

18. The non-transitory computer-readable storage medium according to claim 15, wherein before the receiving, by the network-side device, the resource scheduling request messages, the method further comprises:

determining, by the network-side device, a resource bitmap based on the time-frequency resource pool corresponding to the set, wherein the resource bitmap is corresponding to the N subframes, the resource bitmap comprises a pattern corresponding to the first subframe in the set, the pattern corresponding to the first subframe is first sorted and indexed according to a time domain, and then sorted and indexed according to a frequency domain, and any group of patterns corresponding to the first subframe and any other group of patterns corresponding to the first subframe in the resource bitmap are corresponding to a maximum of K same subframes, wherein the maximum quantity of transmissions of the terminal device is greater than or equal to 2; and the determining, by the network-side device, a target group of patterns from the set based on the resource scheduling request messages comprises:

determining, by the network-side device, the target group of patterns from the resource bitmap based on the resource scheduling request messages.

19. The non-transitory computer-readable storage medium according to claim 18, wherein a resource bitmap used by a first cell is different from a resource bitmap used by a second cell; or a resource bitmap used by a first cell is the same as a resource bitmap used by a second cell, and an allocation sequence of the resource bitmap used by the first cell is different from an allocation sequence of the resource bitmap used by the second cell, wherein the first cell is a cell corresponding to the network-side device, and the second cell is a neighboring cell of the first cell.

20. The non-transitory computer-readable storage medium according to claim 19, wherein a frequency domain allocation sequence of the first cell is different from a frequency domain resource allocation sequence of the second cell.

* * * * *